United States Patent Office 2,771,377
Patented Nov. 20, 1956

2,771,377

THERMOPLASTIC COMPOSITIONS OF WATER-SOLUBLE CELLULOSE ETHERS

George K. Greminger, Jr., Midland, and Miles A. Weaver, Ithaca, Mich., assignors to The Dow Chemical Company, Midland, Mich., a corporation of Delaware No Drawing. Application November 25, 1953, Serial No. 394,478

7 Claims. (Cl. 106—186)

This invention relates to thermoplastic, water-soluble compositions of certain cellulose ethers.

Methods for fabricating useful articles from water-soluble cellulose ethers have been limited to casting and dripping from aqueous solutions. Because of the unique solubility characteristic of those ethers many difficulties arose when it was attempted to use such methods. For example, the temperature of the solution had to remain below the gel point of the cellulose ether during the shaping operation. Another objection was that the amount of cellulose ether in solution had to be restricted, because the viscosity of the solution had to be low enough for casting or dipping operations. A still further objection was the difficulty in dissolving sufficient amounts of the higher viscosity grades of the ethers. Therefore, so that the cellulose ethers may be used in a wider variety of applications for which their properties are ideally suited, it has long been desired to find a thermoplastic water-soluble cellulose ether composition which could be thermally fabricated. One such composition has been disclosed by Silvernail in U. S. Patent 2,602,755. That composition consisted of a water-soluble cellulose ether, propylene glycol, and glycerine in certain stated proportions.

It is an object of this invention to provide water-soluble compositions of cellulose ethers, which compositions are capable of being thermally fabricated.

It has now been found that thermoplastic compositions may be prepared by mixing or blending certain water-soluble cellulose with an amine selected from the group consisting of monoethanolamine, monoisopropanolamine, and triethylene tetramine. Although these compositions are especially well adapted for thermal fabrication, they may also be used in conventional casting and dipping operations.

The cellulose ethers that are useful in the compositions of this invention are water-soluble alkyl, hydroxyalkyl, or alkyl hydroxyalkyl cellulose ethers in which the alkyl group may contain from 1 to 3 carbon atoms and in which the hydroxyalkyl group may contain from 2 to 3 carbon atoms. Of particular usefulness are methyl cellulose, hydroxy propyl cellulose, and methyl hydroxypropyl cellulose.

It is not critical in the compositions of this invention that the aforementioned ethers exhibit thermoplasticity in themselves. The chief requirement for use in this invention, besides the previously mentioned structural limitations, is water solubility. It is well-known that methyl cellulose, and other cellulose ethers which are soluble in aqueous media, differ in their solubility properties depending on the extent to which they are etherified. The least etherified products are soluble only in dilute alkaline media, and often only at low temperatures. The somewhat more highly etherified materials are soluble in water. In a few cases the fully etherified compounds become insoluble in water and are soluble only in organic solvents. Also, certain alkyl hydroxyalkyl cellulose ethers, such as those described in our copending application Serial No. 394,484, filed November 25, 1953, are soluble in both aqueous and organic media.

Any of the commercial available viscosity grades of these cellulose ethers may be employed. The viscosity grade used will depend chiefly on the properties desired in the fabricated article and on other practical considerations such as the length of time required to blend the ethers with the plasticizer. The higher the intrinsic of the cellulose ether, the less fluid will be the composition and the longer will be the time required to mix in the plasticizer.

As previously mentioned, the useful plasticizer for the compositions of this invention are amines selected from the group consisting of monoethanolamine, monoisopropanolamine, and triethylene tetramine.

Other known plasticizers for cellulose ethers, such as propylene glycol may be used in conjunction with the amines of this invention. Their use is not essential, however, in preparing the thermoplastic compositions. The amount that is used in any particular composition will depend on the viscosity grade of the cellulose derivative, and on the intended use of the composition. It should be obvious that when the very high viscosity grades of cellulose ethers (4000 centipoises or higher) are used, high concentrations of the cellulose ether are impractical because the resulting solutions are so viscous that they cannot be easily worked. Also, the fluidity of the plasticized composition that is necessary varies with the type of fabricating operation. For casting and dipping operations, the solutions must have greater fluidity than with most thermal operations, such as injection molding or extrusion. When reference is made herein to the viscosity grade of the cellulose ether, this is the viscosity in centipoises of a 2 percent solution of that ether by weight in water at 20° C.

The compositions of the invention will be further defined by the following illustrative examples.

Example 1

A composition was prepared consisting of 50 parts by weight of a water-soluble methyl hydroxypropyl cellulose (100 cps. viscosity grade) and 50 parts by weight of monoethanolamine. The mixture was heated at 140° C. with agitation to effect solution. The resulting composition was uniformly clear with no evidence of gels.

When the above composition was subjected to extrusion conditions, a clear flexible strip was obtained. When this clear flexible strip was placed in a cavity type mold, pharmaceutical capsules were made by vacuum drawing the strip into the cavities. The capsules produced were deemed to have properties that were superior to the common gelation capsules.

In a similar manner, compositions were prepared using monoisopropanolamine and triethylene tetramine in place of the monoethanolamine. Clear flexible strips were produced by extrusion. These strips could be formed into pharmaceutical capsules that were similar in every respect to those produced from the monoethanolamine composition.

Example 2

Compositions similar to those of Example 1 were prepared using 20 parts by weight of a water-soluble methyl cellulose (100 cps. viscosity grade) and 80 parts by weight of monoisopropanolamine. The resulting composition was a clear solution.

Brass pins were dipped into the clear solution at 120° C., removed, and the composition gelled by cooling to room temperature. When the resulting capsules were stripped from the brass pins, they were found to be equal to the common gelatin capsules.

In a similar manner compositions were prepared using hydroxyethyl cellulose in place of the methyl cellulose. The compositions could be extruded into clear, flexible strips from which capsules could be prepared by vacuum drawing the strips in a cavity-type mold.

We claim:

1. A thermoplastic composition consisting of from 5 to 80 percent of a water-soluble cellulose ether selected from the group of alkyl cellulose, hydroxyalkyl cellulose, and alkyl hydroxyalkyl cellulose in which the alkyl group contains from 1 to 3 carbon atoms and the hydroxyalkyl group contains from 2 to 3 carbon atoms, and correspondingly from 95 to 20 percent of an amine selected from the group consisting of monoethanolamine, monoisopropanolamine, and triethylene tetramine.

2. The composition claimed in claim 1 wherein the cellulose ether is a water-soluble methyl cellulose.

3. The composition claimed in claim 1 wherein the cellulose ether is a water-soluble methyl hydroxypropyl cellulose.

4. The composition claimed in claim 1 wherein the cellulose ether is a water-soluble hydroxyethyl cellulose.

5. The composition claimed in claim 1 wherein the amine is monoethanolamine.

6. The composition claimed in claim 1 wherein the amine is triethylene tetramine.

7. The composition claimed in claim 1 wherein the amine is monoisopropanolamine.

References Cited in the file of this patent

UNITED STATES PATENTS

| | | |
|---|---|---|
| 2,199,927 | Underwood | May 7, 1940 |
| 2,240,151 | Wampner | Apr. 29, 1941 |